3,292,788
PROCESS AND APPARATUS FOR FILTERING LIQUIDS CONTAINING GUMMY OR SLIMY SUSPENDED MATTER
Theodore A. Schwarz, 1465 Saratoga Ave., San Jose, Calif. 95129
Filed Dec. 6, 1963, Ser. No. 328,749
4 Claims. (Cl. 210—80)

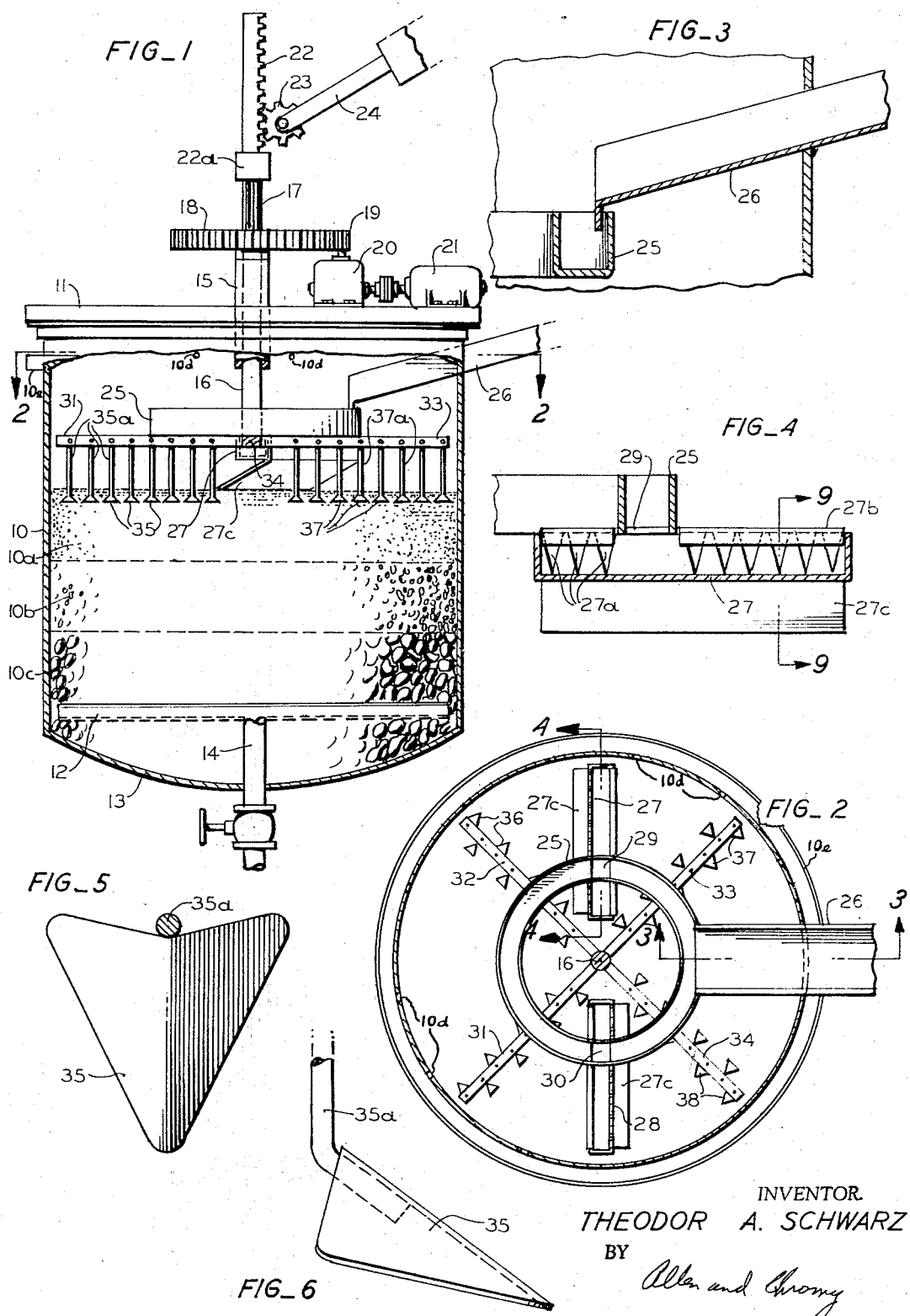

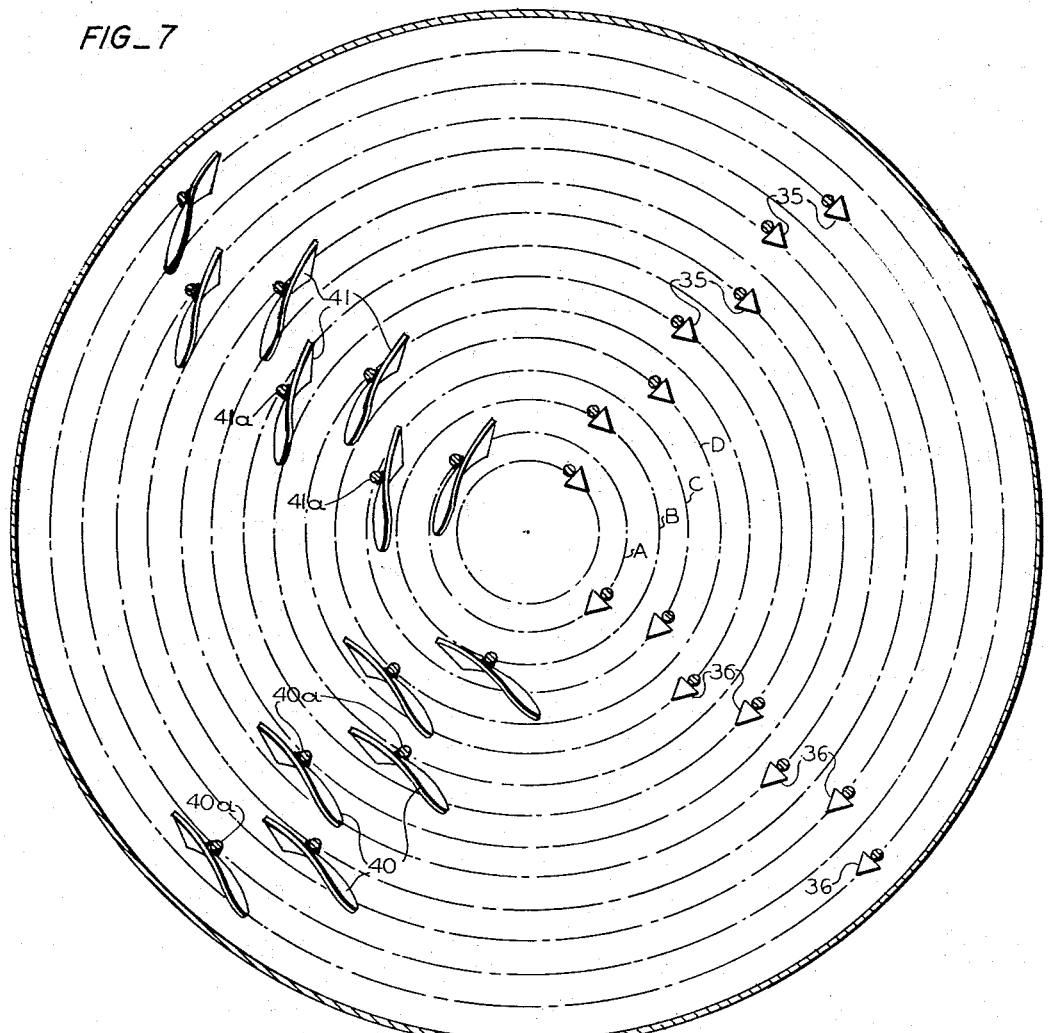
FIG_7
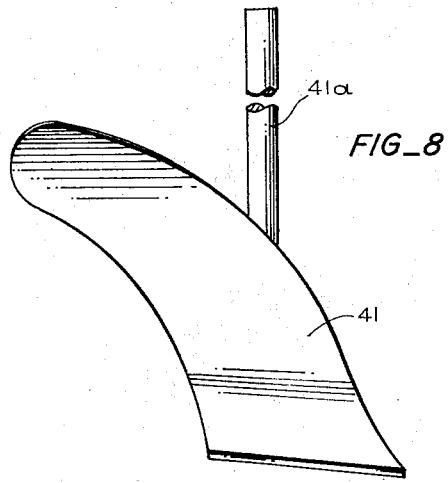
FIG_8
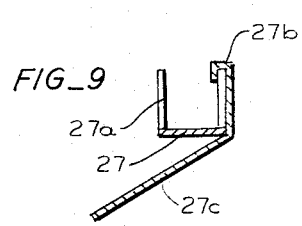
FIG_9
INVENTOR.
THEODOR A. SCHWARZ
BY
ATTORNEYS United States Patent Office 3,292,788
Patented Dec. 20, 1966

This invention relates to a method and apparatus for filtration of difficultly filterable solutions.

The filtration of turbid solutions which contain gummy or slimy suspended matter has always been a vexing problem inasmuch as this type of suspended matter tends to coat the filtering medium with an impervious film and thereby stops the passage of solution. A number of methods of preventing premature plugging of the filter medium surface have been proposed but most of these procedures encumber the filtering process and make it a tedious, slow and expensive procedure. In some industries difficultly filterable solutions are pretreated to transform the suspended matter from a slimy character to a more or less amorphous nature. This is done by heating, by the addition of chemicals which tend to react with a troublesome suspended matter or by adding flocculants. In some cases, the addition of enzymes is resorted to, and the pectic enzymes have been particularly successful in rendering fruit juices more filterable. The most common expedient which is used with such troublesome solutions is, however, to add large quantities of inert material, such as so-called filter aids, to the solution. Filter aids serve to enrobe the suspended particles thus physically separating them from such other matter and thereby destroying their film-forming potential. Filter aids, however, are costly and their successful use requires specialized expensive equipment and skilled operation.

It is an object of this invention to provide an improved apparatus and method for the filtration of turbid solutions which contain gummy or slimy suspended matter by passing the solution through a filter medium which is preferably sand and constantly subjecting said filter medium to the action of mechanical plows which break up the surface crust of the filter medium and turn it under, thereby burying the slimy, gummy materials in the filter medium so that the water of hydration thereof is squeezed out and these materials are compacted into flake-like particles which are easily removed from the filter medium during the backwash cycle.

Other and further objects of this invention will be apparent to those skilled in the art to which it relates from the following specification, claims and drawing.

The particular arrangement which I have found most suitable for the purpose of this invention consists of a series of plows rigidly suspended from a crossarm structure and revolving very slowly in the upper layer of the filter bed. The crossarms are the spokes of a wheel whose hub is driven a drive shaft with its associated bearings, gears and motor. In the preferred arrangement the crossarm assembly is positioned so that the plow blades are just below the surface of the said to begin with, and as the sand becomes loaded with filter rsidue the plows are lowered so that they are several inches below their starting position.

In other words, a progressively larger portion of the filter medium is subjected to plowing.

In order to produce the proper action, it is desirable to keep the superposed pressure acting on the filtering surfaces to the minimum. I have found that about two inches of mercury column pressure difference between the filter outlet and the inlet produces a manageable degree of compaction of the sand, and with it compression of the entrapped filter residue.

This prerequisite is fulfilled when the filter is operated as a simple gravity filter of 5 to 6 feet in height. This does not mean, however that the application of my invention is confined to gravity filters. If means are provided to regulate and control the pressure difference between the filter inlet and outlet, the invention could also be applied to filters operated at other than atmospheric pressures.

Also, the forward speed of the plows should be so slow that their action does not create any appreciable turbulence in the supernatant solution. A speed in the vicinity of 8 inches per minute on the peripheral plows satisfies this condition. The forward travel can be continuous or intermittent. The ratio of forward motion of the plows to downward motion thereof may be of the order of 2500:1.

Referring to the drawing briefly:

FIG. 1 is a view in side elevation partially in section showing an embodiment of this apparatus;

FIG. 2 is a sectional view taken along the lines 2—2 of FIG. 1;

FIG. 3 is a sectional view taken along the line 3—3 of FIG. 2;

FIG. 4 is a fragmentary sectional view taken along the line 4—4 of FIG. 2;

FIG. 5 is a plan view of one of the plows employed in this apparatus;

FIG. 6 is a side view of the plow shown in FIG. 5;

FIG. 7 is a view illustrating a modified plow arrangement;

FIG. 8 is a detail view of one of the right-hand plows used in the arrangement shown in FIG. 7; and FIG. 9 is a sectional view taken along the line 9—9 of FIG. 4.

Referring to the drawing in detail, reference numeral 10 designates a tank which is provided with a cover 11 and a bottom 13. Layers of sand 10a, gravel 10b and rock 10c are provided in the tank 10 so that the sand forms the uppermost layer, the rock forms the lowermost layer and the gravel forms the layer therebetween. An underdrain 12 is positioned in the rock layer 10c. The underdrain consists of a series of perforated pipes which are connected to the central pipe 14 leading through the bottom of the tank to the outside. When the filter medium is to be back-washed, water or other liquid may be supplied through pipe 14 and underdrain 12 and forced up through the filter medium. The wash water flows out of the tank through the holes 10d and into the annular trough 10e to a suitable tank or disposal area.

A shaft 16 extends through a bearing sleeve 15 that is fixedly attached to the cover 11. The upper part of this shaft is provided with splines 17 which engage internal splines in gear 18, thus, when the gear 18 is rotated by the pinion 19 the shaft 16 is also rotated. A motor 21 is coupled to the gear box 20 which is provided for driving the pinion 19. A rack 22 is attached to the top of the spline shaft 17 by the coupling 22a and this rack is engaged by the pinion 23 which is adapted to be rotated by the shaft 24 so that the rack 22 and shaft 16 may be raised or lowered.

The plow and trough assembly is attached to the lower end of the shaft 16 by the radially extending arms 31, 32, 33 and 34 and is rotated thereby. This assembly which is positioned inside of the tank 10 includes the circular trough 25, feed trough 26 and distributing troughs 27 and 28. The feed trough 26 extends to the outside of the tank and the lower end thereof is positioned over the circular trough 25, as shown in FIGS. 1, 2, and 3, so that liquid to be filtered is fed by gravity through this trough into the circular trough 25. The trough 25 is provided with two holes 29 and 30 through which the liquid is fed into the feed troughs 27 and 28, respectively, and these latter troughs may be attached by welding or the like to the bottom of circular trough 25 in registry with these openings, as shown in FIGS. 2 and 4. Each of the troughs 27 and 28 is provided with a swinging baffle such as the swinging baffle 27c, shown in FIG. 4 and 9 which guides the liquid from the distributing troughs to the surface of the filter medium 10a and distributes it over said surface during rotation of the plow and trough assembly. The upper angularly-shaped part 27b of the swinging baffle is hooked over the side of the trough, as shown in FIG. 9. Each of the troughs 27 and 28 is also provided with a plurality of V-shaped slots cut into the sides thereof, such as the holes 27a slots in FIG. 4, so that the liquid fed to these troughs flows out of these holes and onto the swinging baffles attached thereto which guide it to the top of the sand layer 10a during the rotation of these troughs 27 and 28 by the shaft 16 and the driving mechanism therefor.

The radially extending arms 31, 32, 33 and 34 are each provided with a plurality of spaced holes for receiving the rods for supporting the plows 35, 36, 37 and 38, respectively thereon. These plows may be of the type illustrated in FIGS. 5, 6 and 8. In the mechanism shown in FIG. 2, the radial arms are provided with the plows all of which are of the shape shown in FIGS. 5 and 6. The mechanism shown in FIG. 7 is provided with subsoiler type blades 35 and 36 such as are shown in FIGS. 5 and 6, on the first and second arms thereof and the third and fourth arms are provided with mold board plow blades of the type shown in FIG. 8. The plow illustrated in FIG. 8 is of the right hand and this hand is provided to the fourth arm of the apparatus shown in FIG. 7, whereas, the plows provided to the third arm are of the left hand. It will be noted that the mounting rods of the plows of this apparatus describe orbits A, B, C, D, etc. On the other hand, the plows of the different arms rotate in different orbits. The plows 41 of the fourth arm turn the furrow in layer 10a in one direction and the plows 40 of the third arm turn the furrows produced thereby in the opposite direction.

The function of sub-soiler blades 35 and 36 is to loosen up the lowest part of the sandlayer 10a by gently lifting the overburden with a minimum of lateral displacement.

Both the left and right handed mold board plows 40 and 41 are fairly high so that they still are effective at the end of the filtration cycle when they are almost fully submerged in the sand 10a. The subsoiler plows 35 and 36 are of such dimensions and spacing that they cover the entire filter area in one complete revolution. The angle of attack of the subsoiler tip is such that the plow pass under these plows is a corrugated surface. The mold board plows 40 and 41 are set so as to lift and turn the sand above the working level of the subsoilers. Their spacing is such that the furrows which they produce also cover the entire filter area in one revolution. This working of the sand in layer 10a is provided simultaneously as the liquid flows out of the troughs 27 and 28 and onto the top surface of the sand layer 10a so that the sand 10a takes up the filter residue and this residue is disseminated through it. The forward speed of the plows is slow enough so that their motion does not create any appreciable turbulence in the supernatant solution.

While I have shown a preferred embodiment of the invention it will be understood that the invention is capable of variation and modification from the form shown so that its scope should be limited only by the scope of the claims appended hereto.

What I claim is:

1. A method of purifying liquids containing slimy gummy suspended matter without pretreating such solutions and without the use of filteraids, enzymes, and the like, comprising supplying the liquid to be filtered to the top surface of a granular filter medium, collecting said suspended matter on said filter medium, subjecting a portion of the filter medium to a plowing action, said plowing action causing the entrapping of the collected suspended matter in the filter medium and subjecting it to compressive forces by the filter medium which alter the physical nature of the collected matter in such manner that it is no longer capable of forming continuous films which prevent the passage of the liquid to be filtered, and progressively subjecting larger portions of the filter medium to the plowing action to agitate it so as to maintain its permeability to said liquid to be filtered.

2. A method of purifying liquids containing slimy, gummy suspended matter without pretreating such solutions and without the use of filteraids, enzymes and the like, comprising supplying the liquids to be filtered to the top surface of a granular filter medium, collecting said suspended matter on said filter medium, subjecting the upper portion of the filter medium to a plowing action, said plowing action causing the entrapping of the collected suspended matter in the filter medium and subjecting it to compressive forces by the filter medium which alter the physical nature of the collected matter in such manner that it is no longer capable of forming continuous films which prevent the passage of the liquid to be filtered, and progressively subjecting deeper portions of the filter medium to the plowing action, to agitate it so as to maintain its permeability to said liquid to be filtered.

3. An apparatus for filtering liquids containing slimy, gummy suspended matter without pretreating such solutions and without the use of filter aids, enzymes and the like, comprising a tank having a porous granular filtering medium in several layers therein, the top layer being of sand-like consistency and the lower layers being of coarser material, a shaft extending into said tank, means to rotate said shaft, a pluraliy of radially extending arms attached to said shaft, an annular trough supported by said shaft, distributor troughs attached to said annular trough and extending between selected ones of said arms, means for feeding liquid to be filtered to said annular trough, said distributor troughs receiving said liquid from said annular trough and distributing it over the top of said filtering medium as said shaft and said distributor trough are rotated above said filtering medium, a plurality of plows attached to each of said radially extending arms, and means for gradually lowering said plows into said top layer of said filtering medium as liquid to be filtered is supplied thereto and during the rotation of said plows.

4. An apparatus for filtering liquids containing slimy, gummy suspended matter without pre-treating such solutions and without the use of filter aids, enzymes, and the like, comprising a tank having a porous granular filtering medium in several layers therein, the top layer being of sand-like consistency and the lower layers being of coarser material, a shaft extending into said tank, means to rotate said shaft, a plurality of radially extending arms attached to said shaft, an annular trough supported by said shaft and distributor troughs attached to said annular trough, means for feeding liquid to be filtered to said annular trough, said distributor troughs receiving said liquid from said annular trough and distributing it over the top of said filtering medium as said shaft and said distributor trough are rotated above said filtering medium, a plurality of plows attached to each of said radially extending arms, means for lowering such shaft and said radially extending arms so that said plows are lowered into said to layer of said filtering medium, said plows on each of said arms forming two rows, one of which is disposed ahead of the other and the plow units in said rear row being offset from those in the forward row.

References Cited by the Examiner

UNITED STATES PATENTS

| 809,099 | 1/1906 | Desrumaux | 210—280 |
| 3,078,188 | 2/1963 | Assalini | 210—80 X |

FOREIGN PATENTS

| 58,587 | 12/1946 | Netherlands. |

REUBEN FRIEDMAN, *Primary Examiner.*

D. M. RIESS, *Assistant Examiner.*